(12) United States Patent
Yang

(10) Patent No.: US 7,392,070 B2
(45) Date of Patent: Jun. 24, 2008

(54) INPUTTING APPARATUS FOR MOBILE PHONE WITH A DIAL WHEEL

(75) Inventor: Sheng-Hung Yang, Kao Hsiung (TW)

(73) Assignee: Lite-on Technology Corporation, Taipei (TW)

( * ) Notice: Subject to any disclaimer, the term of this patent is extended or adjusted under 35 U.S.C. 154(b) by 522 days.

(21) Appl. No.: 11/025,904

(22) Filed: Jan. 3, 2005

(65) Prior Publication Data
US 2005/0261029 A1 Nov. 24, 2005

(30) Foreign Application Priority Data
May 19, 2004 (TW) .............................. 93207832 U

(51) Int. Cl.
*H04M 1/00* (2006.01)
(52) U.S. Cl. .................. 455/575.1; 455/550.1; 455/90.2; 379/433.06; 379/433.13

(58) Field of Classification Search ............. 455/412.1, 455/569.1, 550.1, 557, 90.2, 566, 575.1; 379/433.06, 433.13
See application file for complete search history.

(56) References Cited

U.S. PATENT DOCUMENTS

| 6,097,964 | A | 8/2000 | Nuovo et al. |
| 6,496,181 | B1 | 12/2002 | Börner et al. |
| 6,546,231 | B1 * | 4/2003 | Someya et al. ............ 455/550.1 |
| 6,768,911 | B2 * | 7/2004 | Hino et al. ................ 455/552.1 |
| 6,978,127 | B1 * | 12/2005 | Bulthuis et al. .......... 455/412.1 |
| 7,120,473 | B1 * | 10/2006 | Hawkins et al. .......... 455/575.1 |
| 2003/0109290 | A1 * | 6/2003 | Moffi et al. .................. 455/569 |
| 2003/0181224 | A1 * | 9/2003 | Peng et al. ................... 455/565 |
| 2004/0266491 | A1 * | 12/2004 | Howard et al. .............. 455/567 |

* cited by examiner

*Primary Examiner*—Blane J Jackson
(74) *Attorney, Agent, or Firm*—Rosenberg, Klein & Lee

(57) ABSTRACT

An input apparatus uses a wheel for input operations of a mobile phone. The input apparatus employs a wheel and two function keys for facilitating the input operations, such as number dialing, short-message editing and menu selecting, for user. The input apparatus according to the present invention is advantageously used for compact mobile phone.

9 Claims, 7 Drawing Sheets

INPUTTING APPARATUS FOR MOBILE PHONE WITH A DIAL WHEEL

BACKGROUND OF THE INVENTION

1. Field of the Invention

The present invention relates to an input apparatus for mobile phone with a dial wheel, and more particularly to an input apparatus for mobile phone with a dial wheel and two function keys for facilitating the number dialing, short-message editing and menu selecting for user.

2. Description of Prior Art

FIG. 1 is a schematic view of a prior art mobile phone with a plurality keys. The operations such as number dialing, short-message editing and menu selecting are performed by pressing the keys on the mobile phone. For example, if a number "109" is to be dialed, the user moves his finger to a key "1" and presses the key "1", then moves his finger to a key "0" and presses the key "0", and then moves his finger to a key "9" and presses the key "9". Finally, the user presses a dial key to dial the number "109".

The next example is exemplified for editing the message "down". The user first moves his finger to the key corresponding to the letter "d", i.e., the key "3" and presses the key consecutively until the letter "d" appears on the screen of the mobile phone. The user then moves his finger to the key corresponding to the letter "o", i.e., the key "6" and presses the key consecutively until the letter "o" appears on the screen of the mobile phone. Afterward, the user moves his finger to the key corresponding to the letter "w", i.e., the key "9" and presses the key consecutively until the letter "w" appears on monitor of the mobile phone. Finally, the user moves his finger to the key corresponding to the letter "n", i.e., the key "6" and presses the key consecutively until the letter "n" appears on the screen of the mobile phone.

For the operation of menu selecting, the conventional mobile phone provides a specific key to activate a menu. Afterward, a user can use an up-direction key and a down-direction key to move a highlighted bar to a specific menu item and then presses another key to select this item.

As can be seen from above description, the operations such as number dialing, short-message editing and menu selecting rely on key operation on the mobile phone.

However, as the mobile phones become more and more compact, the operations through keys thereon may cause problem of typing error.

In U.S. Pat. No. 6,496,181, a mobile phone having a dial wheel is disclosed. In U.S. Pat. No. 6,097,964, a mobile phone having a dial wheel is disclosed to browse web pages on the mobile phone.

However, in above-mentioned two patents, the wheel cannot be used alone to input short message and to dial number, which is still inconvenient to users.

SUMMARY OF THE INVENTION

It is the object of the present invention to provide an input apparatus for mobile phone with a dial wheel and two function keys for facilitating more input functions, such as number dialing, short-message editing and menu selecting, for user.

To achieve the above object, the present invention provides an input apparatus for mobile phone, which has a wheel, a first function key and a second function key. The mobile phone has a screen for showing the operation status and input status. The wheel is rotated either in clockwise direction or in counter-clockwise direction, and the screen shows number/symbol 6, 7, 8, 9, 0, #, and ↓ upon the clockwise direction, and shows 1, 2, 3, 4, 5, *, and ↑ upon the counterclockwise direction. The numbers, letters and symbols are input according to the input status, which include input status (for dialing number), edit status (for editing short message) and menu status (for selecting menu).

In the input status, the user can use wheel to input telephone number. As the user rotates the wheel, a cursor will move with respect to the rotation of the wheel, and locate a number. The wheel is pressed and then released to input the number. A complete telephone number can be input by repeating the above process. The first function key is then used to dial phone call, and the second function key is used to hang up phone call.

In the edit status, the user can use wheel to input letters. As the user rotates the wheel, a cursor will move with respect to the rotation of the wheel. The wheel is pressed repeatedly until a letter to be input appears on the screen, and then the wheel is released to input the letter. A complete message can be input by repeating the above process. The first function key is then used to send the message and the second function key is used to cancel sending message.

In menu status, the wheel is rotated in clockwise direction to scroll the menu downward, and rotated in counterclockwise direction to scroll the menu upward. The first function key is pressed to enter a main menu and the wheel is rotated in clockwise direction or in counterclockwise direction to select desired menu. The first function key is pressed to enter the desired menu and the second function key is pressed to cancel the selection of the menu.

The above summaries are intended to illustrate exemplary embodiments of the invention, which will be best understood in conjunction with the detailed description to follow, and are not intended to limit the scope of the appended claims.

BRIEF DESCRIPTION OF DRAWINGS

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

Figure 1:
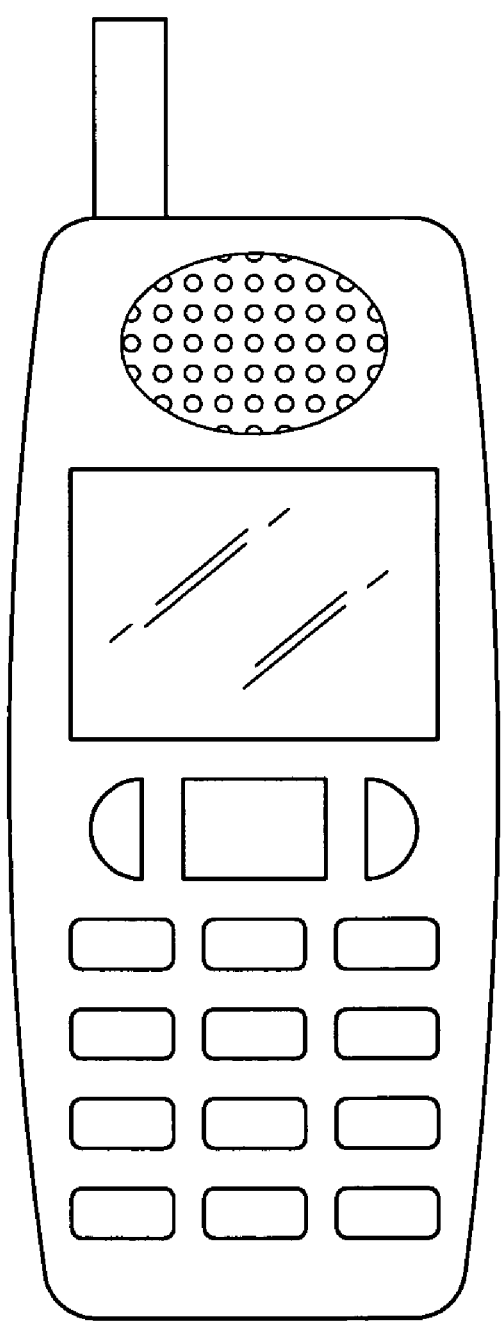
FIG. 1 is a schematic view of a prior art mobile phone with a plurality keys.
Figure 2:
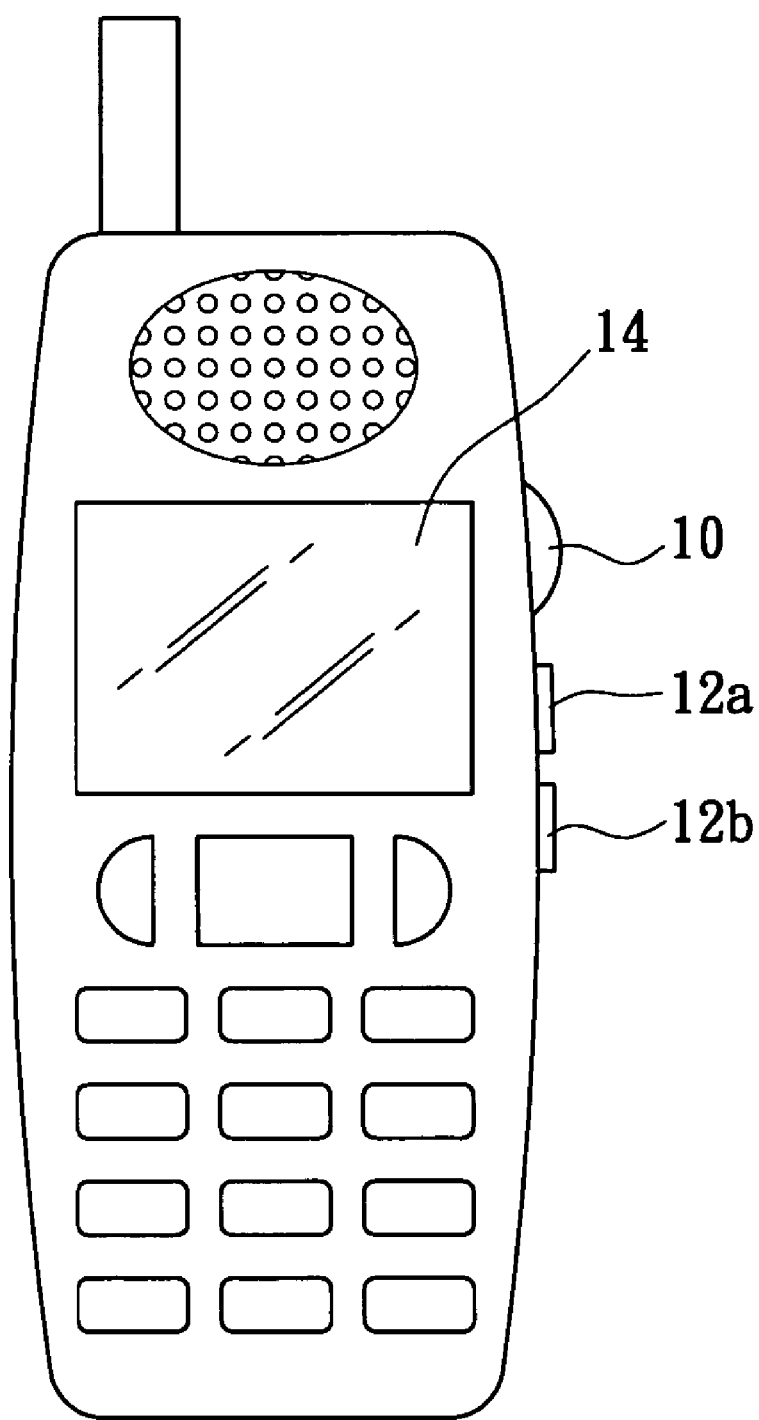
FIG. 2 shows a schematic diagram of a mobile phone with the input apparatus according to the present invention.

FIG. 2 shows a schematic diagram of a mobile phone with the input apparatus according to the present invention. The mobile phone comprises a wheel 10, a first function key 12a, a second function key 12b and a screen 14. The user can use the wheel 10 in conjunction with the first function key 12a and the second function key 12b for input operations such as number dialing, short-message editing and menu selecting.

Figure 3:
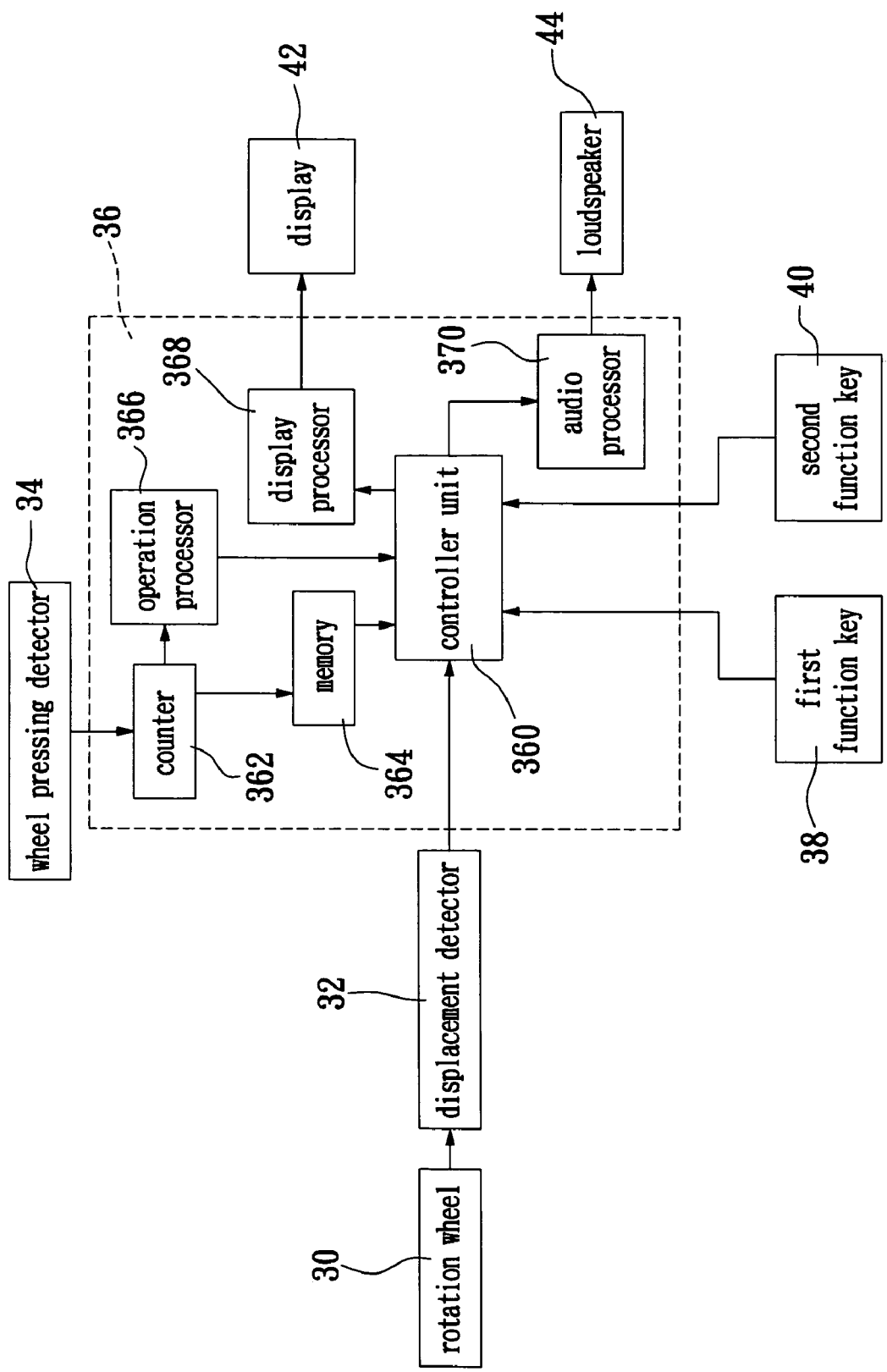
FIG. 3 shows a block diagram of the input apparatus according to the present invention.

FIG. 3 shows a block diagram of the input apparatus according to the present invention. The input apparatus comprises a rotation wheel 30, a displacement detector 32, a wheel pressing detector 34, a wheel controller 36, a first function key 38, a second function key 40, a display 42 and a loudspeaker 44. The wheel controller 36 comprises a controller unit 360, a counter 362, a memory 364, an operation processor 366 and a display processor 368.

During operation, the user rotates the rotation wheel 30 and the displacement detector 32 detects a rotation signal (clockwise or counterclockwise) of the rotation wheel 30. The displacement detector 32 sends the rotation signal to the controller unit 360 for further processing. When the user presses the wheel pressing detector 34, a pressing trigger signal is sent to the counter 362 to count the pressing times and the pressing times is saved in the memory 364. The operation processor 366 calculates a first predetermined time and a second predetermined time in the memory 364 to obtain an operation valve, and sends the operation valve to the controller unit 360.

The controller unit 360 receives signal from the first function key 38, the second function key 40 and processes those signals for operations such as number dialing, short-message editing and menu selecting. The controller unit 360 displays a processing result or a processed result to the display 42 and sends a warming sound to the loudspeaker 44 through an audio processor 370 for alarming user.

Figure 4A:
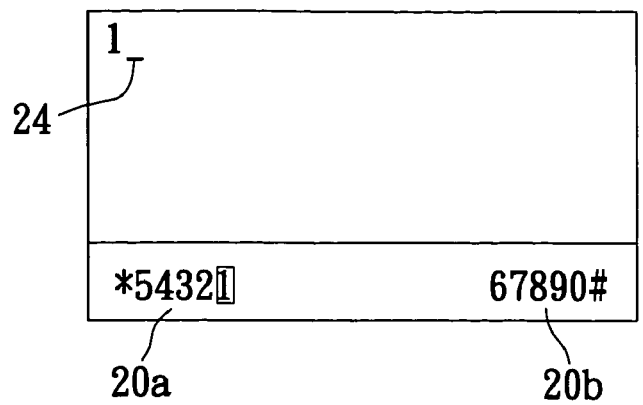
FIG. 4A shows a top view of screen during input operation.
Figure 4B:
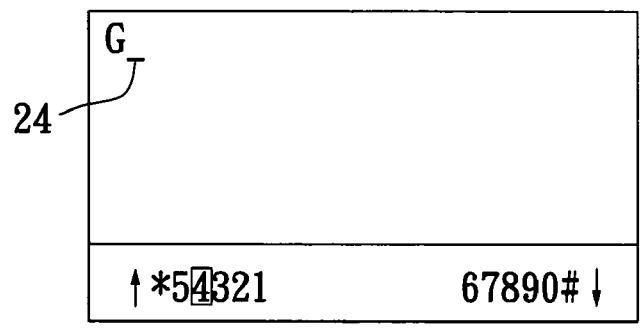
FIG. 4B shows a top view of screen during edit operation.
Figure 4C:
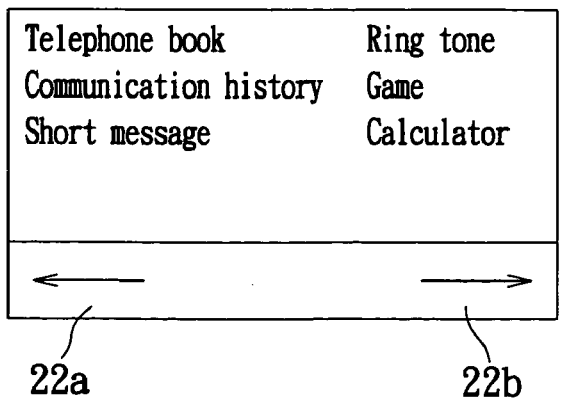
FIG. 4C shows a top view of screen during menu selection operation.

FIG. 4A shows a top view of screen during input operation. There are forward display region 20a and backward display region 20b. FIG. 4B shows a top view of screen during edit operation, wherein a cursor 24 is shown. FIG. 4C shows a top view of screen during menu selection operation, there is a counterclockwise key 22a for up direction and a counterclockwise key 22b for down direction.

Figure 5:
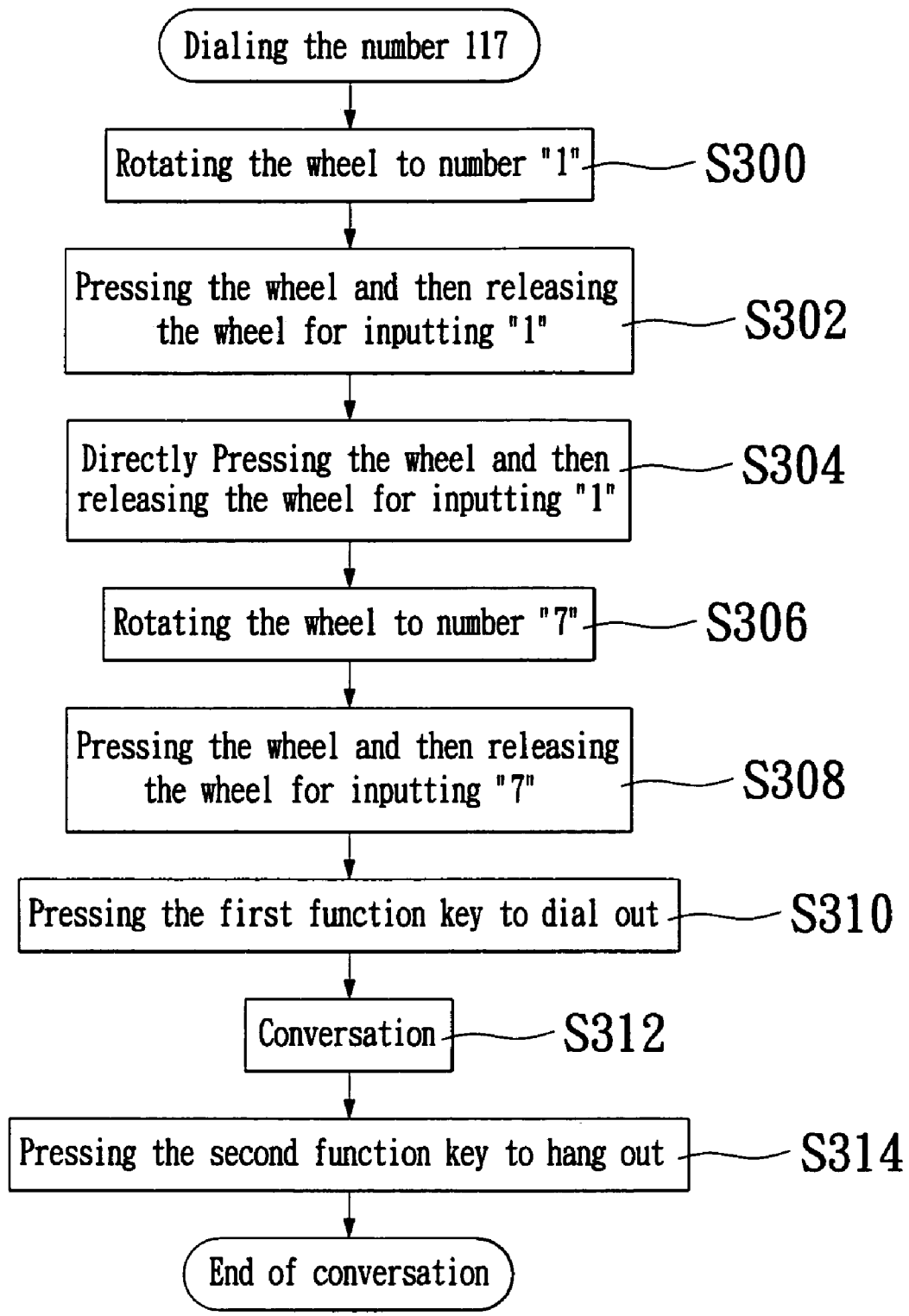
FIG. 5 shows a flowchart according to a first preferred embodiment of the present invention.

FIG. 5 shows a flowchart according to a first preferred embodiment of the present invention, wherein the mobile phone is in dialing operation for dialing a number "117". At step S300, the wheel is rotated by user finger to a location corresponding to number "1", and a highlighted bar appears on the screen and locates the number "1". At step S302, the user presses the wheel 10 and then releases the wheel 10 for inputting the number "1" and then the highlighted bar disappears. At step S304, the user does not rotate the wheel and directly presses the wheel 10 again and then releases the wheel 10 for inputting the number "1" again. To input the number "7", the wheel is rotated by user finger to a location corresponding to the number "7", and a highlighted bar appears on the screen and locates the number "7" at step S306. At step S308, the user presses the wheel 10 and then releases the wheel 10 for inputting the number "7" and the highlighted bar disappears. Afterward, the user presses the first function key 12a to dial this number at step S310 and has telephony communication at step S312. To end the communication, the user presses the second function key 12b to hang up phone call.

The second preferred embodiment is exemplified with editing short message. In conventional mobile phones, the letters a, b, c . . . are generally on location associated with numbers 1, 2, 3 etc. For example, the letters a, b, c are associated with numbers "2" and the letters d, e, f are associated with numbers "3".

Figure 6:
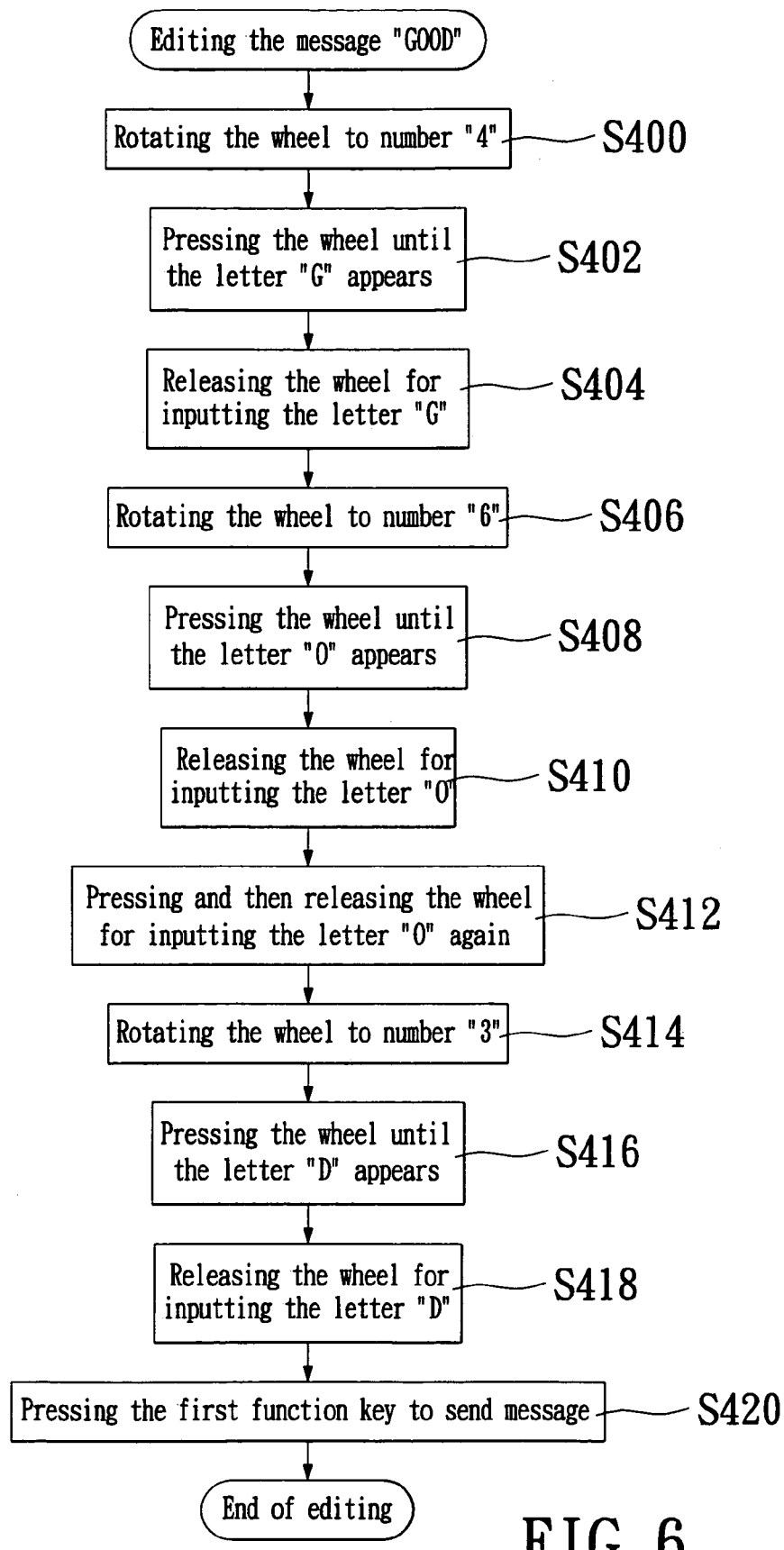
FIG. 6 shows a flowchart according to a second preferred embodiment of the present invention.

FIG. 6 shows a flowchart according to the second preferred embodiment of the present invention, wherein the mobile phone is in editing operation for editing a message "GOOD" on screen thereof. For inputting the letter "G", the wheel is rotated by user finger to a location corresponding to number "4" and then a highlighted bar appears on the screen and locates the number "4" at step S400. Afterward, the user presses the wheel 10 repeatedly until the letter "G" appears on screen at step S402, and then release the wheel 10 to input the letter "G" and let the highlighted bar disappear at step S404. For inputting the letter "O", the wheel is rotated in clockwise direction by user finger to a location corresponding to number "6" and then a highlighted bar appears on the screen and locates the number "6" at step S406. Afterward, the user presses the wheel 10 repeatedly until the letter "O" appears on screen at step S408, and then release the wheel 10 to input the letter "O" and let the highlighted bar disappear at step S410. To input the letter "O" again, the user does not need to rotate the wheel 10 and only needs to press the wheel 10 again and then releases the wheel 10 to input the letter "O" again at step S412. For inputting the letter "D", the wheel is rotated in counterclockwise direction by user finger to a location corresponding to number "3" and a highlighted bar appears on the screen and locates the number "3" at step S414. Afterward, the user presses the wheel 10 repeatedly until the letter "D" appears on screen at step S416, and then release the wheel 10 to input the letter "D" and let the highlighted bar disappear at step S418. The message "GOOD" can be edited by above steps.

Before sending this message, the message can be corrected by using the wheel 10 in conjunction with the cursor 24. In case that the letter to be corrected is placed in front of the cursor 24, the wheel 10 is rotated in counterclockwise direction (up direction) to move the cursor 24 to the letter to be corrected. In case that the letter to be corrected is placed after the cursor 24, the wheel 10 is rotated in clockwise direction (down direction) to move the cursor 24 to the letter to be corrected. After the message is corrected, the corrective message is sent by pressing the first function key 12a.

The third preferred embodiment is exemplified with menu selection. The menus of mobile phones have different layouts and functions, depending on the firmware developed. The menu generally comprises basic functions like telephone book, short message service and ring tone setting.

Figure 7:
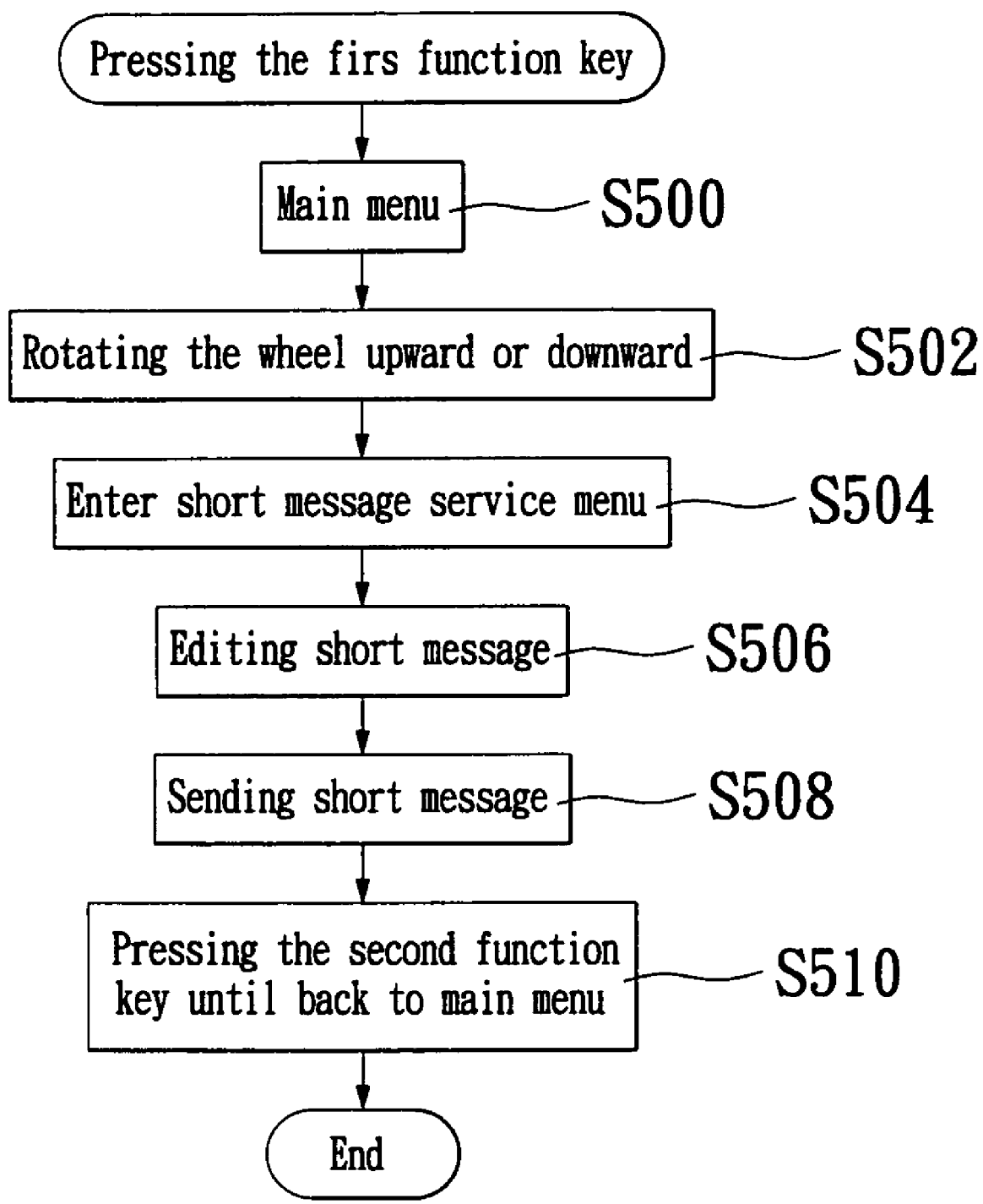
FIG. 7 shows a flowchart according to a third preferred embodiment of the present invention.

FIG. 7 shows a flowchart according to the third preferred embodiment of the present invention, wherein the mobile phone is in menu selection operation. This preferred embodiment is exemplified with how to access short message menu. The user presses the first function key 12a to enter the main menu (step S500). The wheel is rotated upward or downward to select the short message menu at step S502 and the first function key 12a is pressed to enter the short message menu at step S504. The user then rotates the wheel upward or downward to select the message-editing menu and then presses the first function key 12a to enter the message-editing menu for editing short message at step S506. After the message editing is completed, the first function key 12a is pressed to send the message at step S508. After sending the message, the user can press the second function key 12b until the screen is back to the main menu (step S510).

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. An input apparatus for a mobile phone with a dial wheel, comprising:
- a wheel;
- a displacement detector electrically connected to the wheel;
- a first function key
- a second function key;
- a display;
- a loudspeaker;
- a wheel pressing detector; and
- a wheel controller including:
  - (a) a counter electrically connected to the wheel pressing detector;
  - (b) a memory electrically connected to the counter;
  - (c) a display processor electrically connected to the display;
  - (d) an audio processor electrically connected to the loudspeaker;
  - (e) a controller unit electrically coupled to each of the first function key, the second function key, the memory, the display processor, the audio processor, and the displacement detector; and,
  - (f) an operation processor electrically coupled to the counter and the controller unit, whereby the operation processor calculates a difference value between a first predetermined time and a second predetermined time counted by the counter, and then sends the difference value to the controller unit, wherein the wheel is used with the first function key and the second function key for executing input function of the mobile phone.

2. The input apparatus for a mobile phone as in claim 1, wherein the display is a screen of the mobile phone.

3. The input apparatus for a mobile phone as in claim 2, wherein the display is used for displaying numbers, letters or other auxiliary symbols.

4. The input apparatus for a mobile phone as in claim 3, wherein the numbers include 6, 7, 8, 9, 0, and # along a clockwise direction; and 1, 2, 3, 4, 5 and * along a counter-clockwise direction.

5. The input apparatus for a mobile phone as in claim 3, wherein the numbers include 1, 2, 3, 4, 5 and * along a clockwise direction; and 6, 7, 8, 9, 0, and # along a counter-clockwise direction.

6. The input apparatus for a mobile phone as in claim 1, wherein the counter counts a first predetermined time and a second predetermined time for the wheel pressing detector.

7. The input apparatus for a mobile phone as in claim 1, wherein the memory is used to store a first predetermined time and a second predetermined time counted by the counter.

8. The input apparatus for a mobile phone as in claim 1, wherein the first function key is used for dialing out, selecting a main menu and selecting a menu item.

9. The input apparatus for a mobile phone as in claim 1, wherein the second function key is used for hanging up phone call and canceling selection.

* * * * *